April 20, 1926.
K. O. A. JOHANSSON
AUTOMATIC MEASURING APPARATUS FOR SAWMILLS
Filed May 16, 1924    2 Sheets-Sheet 1
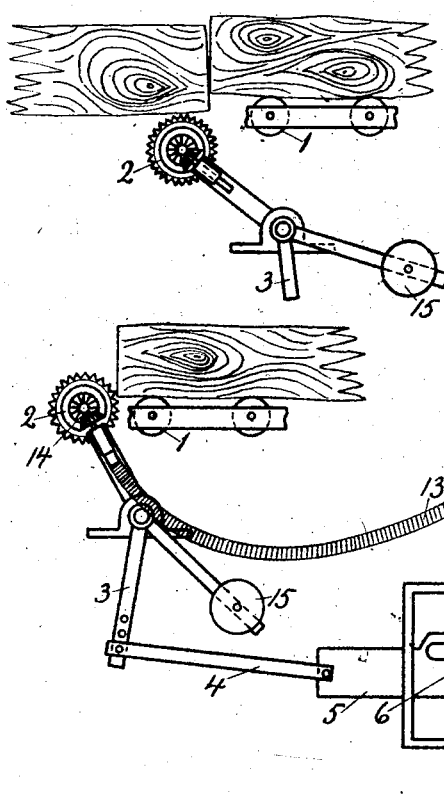
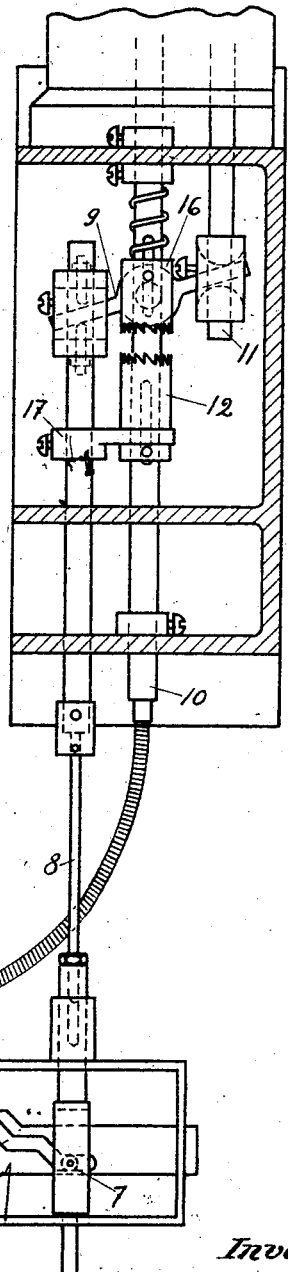
Inventor
Karl O. A. Johansson
By William C. Linton
Attorney April 20, 1926.
K. O. A. JOHANSSON
1,581,315
AUTOMATIC MEASURING APPARATUS FOR SAWMILLS
Filed May 16, 1924    2 Sheets-Sheet 2
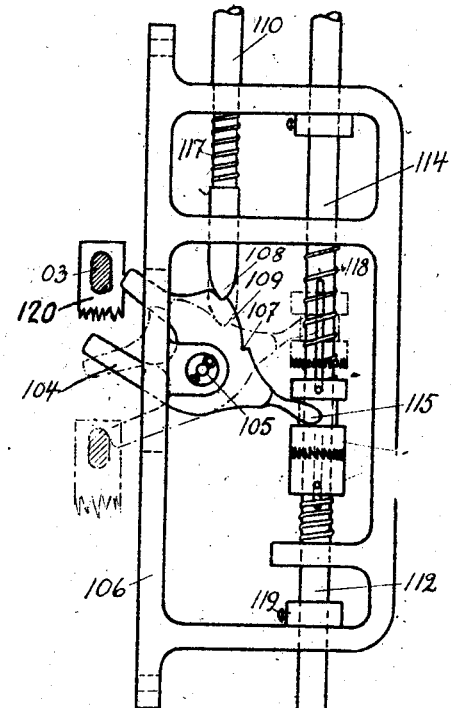
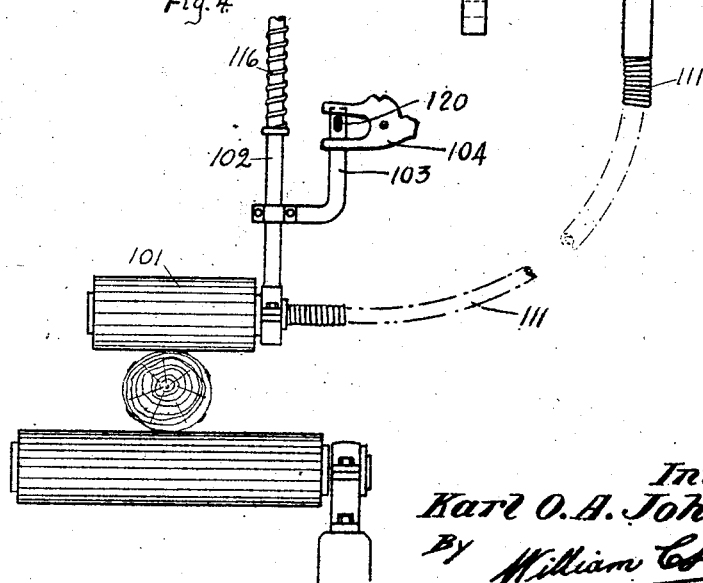
Inventor
Karl O. A. Johansson
By William Clinton
Attorney Patented Apr. 20, 1926.

1,581,315

UNITED STATES PATENT OFFICE.

KARL OSKAR ADOLF JOHANSSON, OF STOCKHOLM, SWEDEN.

AUTOMATIC MEASURING APPARATUS FOR SAWMILLS.

Application filed May 16, 1924. Serial No. 713,836.

*To all whom it may concern:*

Be it known that I, KARL OSKAR ADOLF JOHANSSON, a subject of the King of Sweden, residing in the city of Stockholm and Kingdom of Sweden, have invented a new and useful Automatic Measuring Apparatus for Sawmills, of which the following is a specification.

This invention relates to an automatic counting or measuring apparatus for counting or measuring or both of the number, length and eventually the diameter of the logs, passing through a frame sawing machine or the like.

If combined with a suitable multiplication device of a known kind and adjustable for different sawing speeds, the apparatus can be used as an automatic apparatus for recording directly the volume of the lumber passing through the machine.

The invention is illustrated in the accompanying drawings, in which Figure 1 is a vertical section of the apparatus with the protecting cover removed, and seen from the side nearest the log. Fig. 2 is a detail thereof, with the measuring roller in a changed position. Fig. 3 is a side view of a modification of the coupling device between the measuring and the registering apparatus with the protecting cover removed. Fig. 4 is a vertical elevation of a modification of the measuring device, seen in the direction of the log.

In Fig. 1 is shown a log, just passing the back roller 1 of a frame sawing machine. The front end of the log just hits and lowers a toothed roller 2, which is connected to a flexible shaft 13 by gears 14. The shaft 13 is connected with the shaft 10, which is coupled to the shaft of a length-recording device of a known kind (not shown) by a clutch-coupling 12, 16.

The toothed roller 2 turns in one arm of a lever 3, the other arm of which is secured to a rod 4, acting upon a slide-block 5, provided with a crankled slot 6, consisting of three horizontal slots, connected by two inclined slots. In the slot slides a pin 7, attached to a rod 8, which is firmly connected to the lower part 12 of the clutch-coupling. To the top of the rod 8 is secured a suitable device, acting upon one arm of a lever 9, the other arm of which acts upon a rod 11, operating a number-recording device (not shown).

When the log has passed the roller 1, as shown in Fig. 2, its weight presses the roller 2 downwards still more, counteracted by the weight 15, whereby the pin 7 is forced into the highest part of the slot 6 and the rod 11 pushed down, acting upon the number-recording device.

While the log during the sawing is resting upon the roller 1, the pin 7 occupies its middle position, and the clutch-coupling is in gear. While running idle, the pin 7 is in its lowest position, and the clutch-coupling is out of gear.

In Figures 3 and 4, 101 is the upper feed roller of the frame sawing machine, or one of them if there are several, 102 is a rod, the lower end of which loosely encloses the shaft of the roller 101. When the shaft of the roller is raised from its lowest position, a spring 116 acting upon the rod 102 is compressed, thus striving to bring the shaft back to its former position. To the rod 102 is adjustably attached a rod 103 or the like, provided at a suitable level with a projection 120 or the like, which at the motion of the shaft 102 up and down, brings with it one shank of a fork 104, secured to a shaft 105, turning in bearings, attached to a frame 106. The hub of the fork is, on one side, provided with two recesses 107 and 108, and, between them, a curved surface 109. Against this part of the fork a rod 110 is pressed down by a spring, the opposite end of this rod operating a recording device (not shown). The opposite end of the fork 104, relative to the shanks, is provided with an extension, terminated by a knob 115 or the like, of rounded shape or by a fork with such ends. The fork ends or the knob 115 engage a recess in one part of a clutch-coupling 113 or the like, one part of the coupling being attached to a shaft 114, operating a recording device (not shown), and provided with a spring 118 that acts upon the coupling, while the other part of the coupling is fastened to a shaft 112, secured to the flexible shaft 111, that is connected to the shaft of the upper feed roller 101. The shafts 114 and 112 turn in bearings attached to the frame 106. The shaft 112 is provided with an adjustable stop collar 119, to bring the shaft into the desired position when the coupling 113 is thrown out of gear.

The apparatus acts in the following way:

As the feed roller 101 is raised above a log, the rod 102 with the connecting rod 103 are also raised, so that the projection of the sleeve, attached to the rod 103, strikes the upper shank of the fork 104 and turns the fork, whereby the rod 110 is raised along the curved surface 109 and removed from the recess 107 to the recess 108. As the rod 110 thus is being raised, it operates the counting device, recording one log. Simultaneously the knob 115 has pulled the upper part of the coupling 113 with the shaft 114 downwards into gear with the lower part of the coupling, whereby the shaft 114, acting upon the recording device, will rotate with the same speed as the shaft of the roller 101.

At the end of the sawing operation the roller 101 falls down against its support, the projection of the said sleeve hits the lower shank of the fork 104, turning the same. The rod 110 is then lowered following the curve 109 back to its former position in the lower recess 107. At the same time the knob 115 disrupts the connection between the shafts 111 and 114.

A continued rotation of the roller 101 will thus not be registered by the recording device, operated by the shaft 114.

If, in a compound or integrating registrating apparatus, the rod 110 acts upon one part indicating one dimension (diameter or height), and the shaft 114 acts upon another part indicating another dimension (length), it is apparent that the registrating apparatus will directly indicate the volume of the passing lumber, as in the registrating apparatus (for round lumber) the motion of the shaft 110 can be transformed in the desired ratio to give the area of the log, and this quantity in the usual way be multiplied with the length indicated by the shaft 114, thus directly showing the volume of the lumber. As to lumber with parallel surfaces (scantlings), a couple of rollers movable at right angles to the roller 101 may be provided, acting upon a shaft indicating the horizontal dimension.

The apparatus may also be used for measuring other material than lumber.

The forms illustrated in the drawings do only exemplify this invention, which is susceptible of various changes within wide limits as to details of construction etc., and the rights are herein reserved to make such changes as properly fall within the scope of the appended claims.

I claim:

1. An automatic measuring and recording device for saw mills and the like comprising a rotary member adapted for engagement by the moving lumber, a shaft connected to the rotary member for rotation therewith and adapted for attachment to a length-recording device, a rod adapted for connection to a number-recording device, and an operative connection between said rod and rotary member, adapted for actuation upon shifting of the rotary member due to the pressure of a moving log thereon.

2. An apparatus according to claim 1 in which the rotary member consists of a feed roller adapted to be raised by the passing log.

3. An automatic measuring and recording device comprising a rotary member adapted for actuation by the moving lumber, a connecting rod attached to said roller and adapted for movement upon shifting of said roller, a frame, a fork pivoted in said frame and connected to said rod, said fork being formed with two recesses and a curved surface between said recesses, a second rod adapted to operate a number-recording device, one end of said rod being adapted to enter said recesses and to ride on the curved surface.

4. An apparatus according to claim 3 further characterized by a shaft journaled in the frame and adapted to operate a length-recording device, an operative connection between said shaft and the feed-roller whereby the shaft is rotated upon rotation of the roller, a clutch interposed in said shaft, said clutch being connected to the pivoted fork.

In witness whereof I have hereunto set my hand.

KARL OSKAR ADOLF JOHANSSON.